(12) United States Patent
Burns

(10) Patent No.: US 6,675,841 B2
(45) Date of Patent: Jan. 13, 2004

(54) FUEL STORAGE TANK COUPLING WITH VAPOR RECOVERY

(75) Inventor: Jeffrey M. Burns, Waterford, PA (US)

(73) Assignee: Snap-tite Technologies, Inc., Wilmington, DE (US)

( * ) Notice: Subject to any disclaimer, the term of this patent is extended or adjusted under 35 U.S.C. 154(b) by 0 days.

(21) Appl. No.: 09/735,275

(22) Filed: Dec. 12, 2000

(65) Prior Publication Data

US 2002/0121313 A1 Sep. 5, 2002

(51) Int. Cl.[7] .............................................. B65B 31/00
(52) U.S. Cl. .................... 141/59; 141/302; 141/384; 137/614.04
(58) Field of Search .................... 141/59, 351, 350, 141/348, 349, 302, 384; 220/DIG. 33, 86.2; 137/614.04, 614.03, 68.14; 251/3

(56) References Cited

U.S. PATENT DOCUMENTS

| | | | | |
|---|---|---|---|---|
| 3,513,887 A | * | 5/1970 | Limandri | |
| 3,777,771 A | * | 12/1973 | De Visscher | 137/1 |
| 4,157,104 A | * | 6/1979 | Lofquist, Jr. | 220/86.2 |
| 4,429,725 A | | 2/1984 | Walker et al. | |
| 4,441,533 A | * | 4/1984 | Snyder et al. | 220/86.2 |
| 4,763,683 A | | 8/1988 | Carmack | |
| 4,949,745 A | * | 8/1990 | McKeon | 137/15.09 |
| 5,027,868 A | * | 7/1991 | Morris et al. | 220/DIG. 33 |
| 5,063,965 A | * | 11/1991 | Wilcox | 137/614.03 |
| 5,295,521 A | | 3/1994 | Bedi | |
| 5,297,595 A | * | 3/1994 | Haile et al. | 220/DIG. 33 |
| 5,301,723 A | * | 4/1994 | Goode | |
| 5,327,943 A | | 7/1994 | Strock et al. | |
| 5,385,178 A | | 1/1995 | Bedi | |
| 5,433,247 A | * | 7/1995 | Guertin | 137/614.04 |
| 5,732,840 A | * | 3/1998 | Foltz | 141/348 |
| 6,170,522 B1 | * | 1/2001 | Tanida | 137/614.02 |

* cited by examiner

*Primary Examiner*—Gregory L. Huson
*Assistant Examiner*—Khoa D Huynh
(74) *Attorney, Agent, or Firm*—Woodling, Krost and Rust

(57) ABSTRACT

A coupling device for fueling automobile gasoline tanks is disclosed and claimed. The coupling has two parts: a cap assembly (female half) and a nozzle assembly (male half). Little or no spillage occurs due to opposing flush faces of the female main valve and the plug of the male. The cap assembly is affixed to an existing gasoline tank (fuel storage tank) or alternatively can be supplied as original equipment on a new automobile. Fuel vapor is extracted from the automobile fuel tank with high efficiency and returned to the pumping station for storage and/or reprocessing. Vapors and/or liquid fuel are extracted through the portion of the gasoline tank cap assembly which resides within the tank. Apertures in the cap assembly communicate with an annular passageway which removes the vapors to ports which mate with peripheral apertures in a concentric nozzle having an outer sheath and an inner fluid conduit. The gasoline tank cap assembly includes a vent valve for relieving pressure within the tank when necessary. A vent sleeve is also provided for supplying air to the gasoline tank when necessary. A method of recovering fuel vapor from a fuel storage tank is also disclosed and claimed.

15 Claims, 15 Drawing Sheets

FUEL STORAGE TANK COUPLING WITH VAPOR RECOVERY

FIELD OF THE INVENTION

As liquid fuel enters a vehicle gasoline tank during fueling, fuel vapors are displaced out of the tank and into the atmosphere. This invention relates to a coupling which includes a cap assembly (female coupling half) which sealingly engages a standard vehicle gasoline tank and a nozzle assembly (male coupling half) which is attached to or is integral with the spout of a hand-held fuel dispensing nozzle. The cap assembly may be adapted to any existing vehicle gasoline tank or it may be installed without an adapter as an integral part of a vehicle gasoline tank.

The nozzle assembly on the spout of the dispensing nozzle couples with the cap assembly of the vehicle gas tank during fueling and provides for fuel vapor recovery directly from the vehicle gasoline tank to the vacuum recovery system. A predetermined pressure differential between the vehicle gasoline tank and the atmosphere is maintained by a vent valve and a vent sleeve in the cap assembly.

BACKGROUND OF THE INVENTION

It is highly desirable to recover fuel vapor during refueling of a vehicle gasoline tank. Damage to the environment caused by vapor escape to the environment is well documented in U.S. Pat. No. 5,327,943 to Strock et al. issued Jul. 12, 1994. Hydrocarbon vapor release to the atmosphere when exposed to sunlight can react with air contaminants to create ozone.

Fuel costs continue to soar and the present crude oil price exceeds $30.00 per barrel thus making vapor recovery economical. U.S. Pat. No. 4,429,725 to Walker et al. cites a 97.6% recovery of the vapor which would have been emitted (without vapor recovery) but for the use of the '725 invention.

U.S. Pat. Nos. 5,385,178 and 5,295,521 to Bedi disclose a flat planar surface disposed on a filler cap with the cap being threaded into an existing gasoline tank receptacle. Bedi '178 and '521 further disclose two commercially available coupling halves mounted into or on the flat planar surface. The couplings halves mate with commercially available reciprocal coupling halves. One coupling feeds and is connected to a fuel vapor return line and the other coupling feeds and is connected to fuel a supply line. The vapor return line is separate from and independent of the fuel dispensing nozzle.

There are two known vapor recovery systems: balanced pressure systems and vacuum assist systems. Balanced pressure systems use an elastomeric boot or other positive sealing device to engage and seal the fill opening of the tank during refueling. "The interior of the boot is connected to a vapor return conduit to the underground storage tank so that hydrocarbon vapors emitted during fueling naturally flow to the storage tank to maintain the pressure balance between the vehicle tank and the storage tank. The vacuum assist differs from the balanced pressure system because it does not require a tight sealing boot or some other positive sealing arrangement with the fill opening or filler pipe of the vehicle tank. Instead, the vapor return conduits are connected through a vapor pump or other vacuum inducing assist device to collect and transport the vapors emitted during fueling to the storage tanks." See, the '943 patent to Strock et al. at column 1, lines 51–69.

Given the high cost of fuel and given the environmental damage caused by fuel vapor in the atmosphere, it is highly desirable to increase the efficiency of the vapor recovery process. An increase in the efficiency of the vapor recovery process will produce a better environment with attendant financial savings. The coupling of the instant invention combines the features of positive sealing and vacuum assist. The nozzle assembly seals against the cap assembly. Passageways in the cap and nozzle assemblies permit fluid and gaseous communication between the vehicle tank and the service station storage tank.

The invention will be better understood when reference is made to the Summary of the Invention, Brief Description of the Drawings, Description of the Invention and Claims which follow below.

SUMMARY OF THE INVENTION

A coupling for a fuel storage tank such as a vehicle gasoline tank is disclosed and claimed. The coupling includes a cap assembly (female coupling half) and a nozzle assembly (male coupling half). The cap assembly is sealingly attached to the vehicle gasoline tank and the nozzle assembly is affixed to the spout of a dispensing nozzle. Once attached to an existing gasoline tank the female coupling half (cap assembly) is normally not removed except if maintenance is to be performed. Additionally, the female coupling half (cap assembly) may be removed from the vehicle gasoline tank if the vehicle is being fueled at a nonconforming service station (i.e., one which does not employ the nozzle assembly of the instant invention. The cap assembly includes a body and the body includes a plurality of apertures in communication with the vehicle gasoline tank. A passageway interconnects the plurality of apertures with a plurality of ports. A substantially flush faced valve covers and closes the ports when the cap assembly is not coupled to the nozzle assembly. The valve uncovers and opens the ports when the coupling halves, namely, the cap assembly and the nozzle assembly are coupled together.

The nozzle assembly includes an annular passageway formed by an outer sheath which is concentric with an inner fluid conduit. The nozzle assembly includes a plug mounted and secured partially in the annulus having radial ports therein. A flush faced valve is formed by the plug having ports and a sliding sleeve. The spout of a dispensing nozzle is generally the portion of the nozzle which is distal (remote) from the hand-held portion of the nozzle. Apertures in the outer sheath enable communication between the vehicle fuel tank and the passageway of the nozzle assembly when the coupling halves are coupled together. The passageway of the cap assembly communicates with the vehicle gas tank via apertures. Ports of the cap assembly communicate with the passageway of the cap assembly and with the nozzle assembly via the apertures in the outer sheath of the nozzle assembly when the coupling halves are coupled together.

When the male coupling half (nozzle assembly) and the female coupling half (cap assembly) are uncoupled little or no spillage occurs due to the flush face configuration of the valve in the female half and the flush face configuration of the plug in the male half.

Vapor from a vehicle gasoline tank is displaced during fueling of the vehicle as the volume for the vapor is reduced by incoming fuel. Use of the term "fueling" herein includes the term "refueling." When vapor is displaced it is directly communicated to a vacuum assisted recovery system. Seals insure that the vapor remains in the passageway of the coupling halves and does not migrate to the atmosphere. Seals also insure that the liquid gasoline is delivered to the vehicle gasoline tank without fluid or vapor migration to the atmosphere.

When the halves are coupled together vapor recovery is effected utilizing mechanical seals and passageways under the influence of a vacuum. When the halves are uncoupled the cap assembly functions to relieve excess pressure within the vehicle gasoline tank. As liquid gasoline is consumed a vacuum is created within the tank and the cap assembly also functions to add air from the atmosphere into the tank.

It is an object of the present invention to provide a coupling for a vehicle gasoline tank and gasoline dispensing nozzle which maximizes vapor recover from the vehicle gasoline tank.

It is a further object of the present invention to provide a cap assembly which sealingly interconnects with a vehicle gasoline tank.

It is a further object of the present invention to provide a cap assembly which includes an adapter enabling interconnection with existing vehicle gasoline tanks.

It is a further object of the present invention to provide a cap assembly which includes a vent valve for relieving pressure when a curtain pressure differential between the interior of a vehicle gasoline tank and the atmosphere is exceeded.

It is a further object of the present invention to provide a cap assembly which includes a vent sleeve for admitting air to the interior of a vehicle gasoline tank when a curtain pressure differential between the atmosphere and the interior of the gasoline tank is exceeded.

It is a further object of the present invention to provide a cap assembly which is small enough to fit within the gasoline cap access door and the vehicle gasoline tank.

It is a further object of the present invention to provide a nozzle assembly affixed to the spout of a dispensing nozzle.

It is a further object of the present invention to provide a low or no spill fuel coupling.

It is a further object of the present invention to provide a cap assembly for the removal of gasoline or other fuel vapor directly from a fuel storage tank through apertures in the cap assembly which interconnect with an annular passageway which, in turn, interconnects with ports.

It is a further object of the present invention to provide a cap assembly which includes a main valve for covering and uncovering ports which interconnect with an annular passageway.

It is a further object of the present invention to provide a cap assembly, or female coupling half, which sealingly couples together with a nozzle assembly, or male coupling half.

It is a further object of the present invention to provide a cap assembly which sealingly couples with a nozzle assembly and which further includes a sealed passageway interconnecting the vehicle gasoline tank and a vacuum source interconnected with a passageway in the nozzle assembly.

It is a further object of the present invention to provide a female coupling half and a male coupling half adapted to interconnect with a vehicle gasoline tank.

It is a further object of the present invention to provide a nozzle assembly which includes a plug having ports for the delivery of liquid when coupled with the cap assembly. The plug is partially press fit into an annular space defined by the inner fluid conduit and the outer sheath of the nozzle assembly.

It is a further object of the present invention to provide a nozzle assembly which has an inner fluid conduit, an outer sheath having a plurality of apertures therein, a plug partially press fit within and tack welded to the fluid conduit and outer sheath, a sliding sleeve affixed to a sleeve guide, and a body.

The invention will be better understood when reference is made to the Brief Description of the Drawings, Description of the Invention and Claims which follow hereinbelow.

A better understanding of the drawings will be had when reference is made to the Description of the Invention and Claims which follow hereinbelow.

DESCRIPTION OF THE INVENTION

Figure 6:
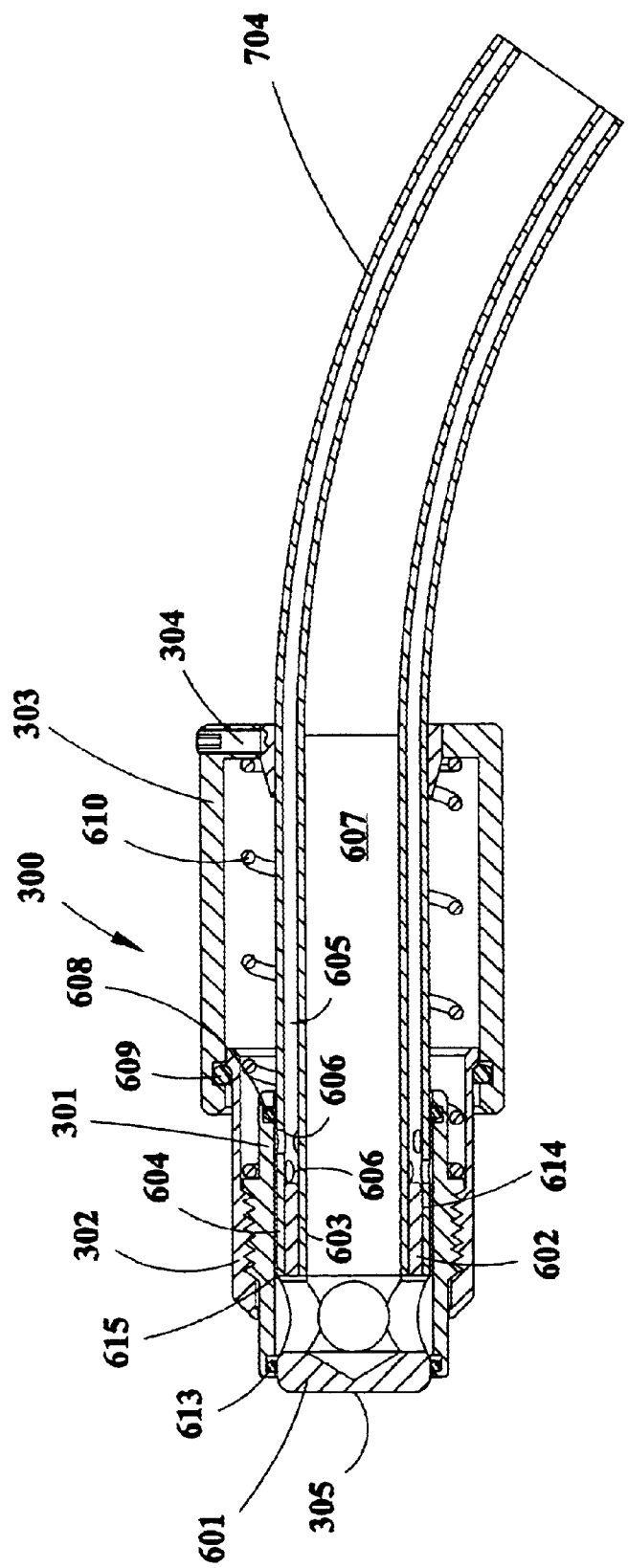
FIG. 6 is a cross-sectional view of the nozzle assembly of FIG. 3.
Figure 7:
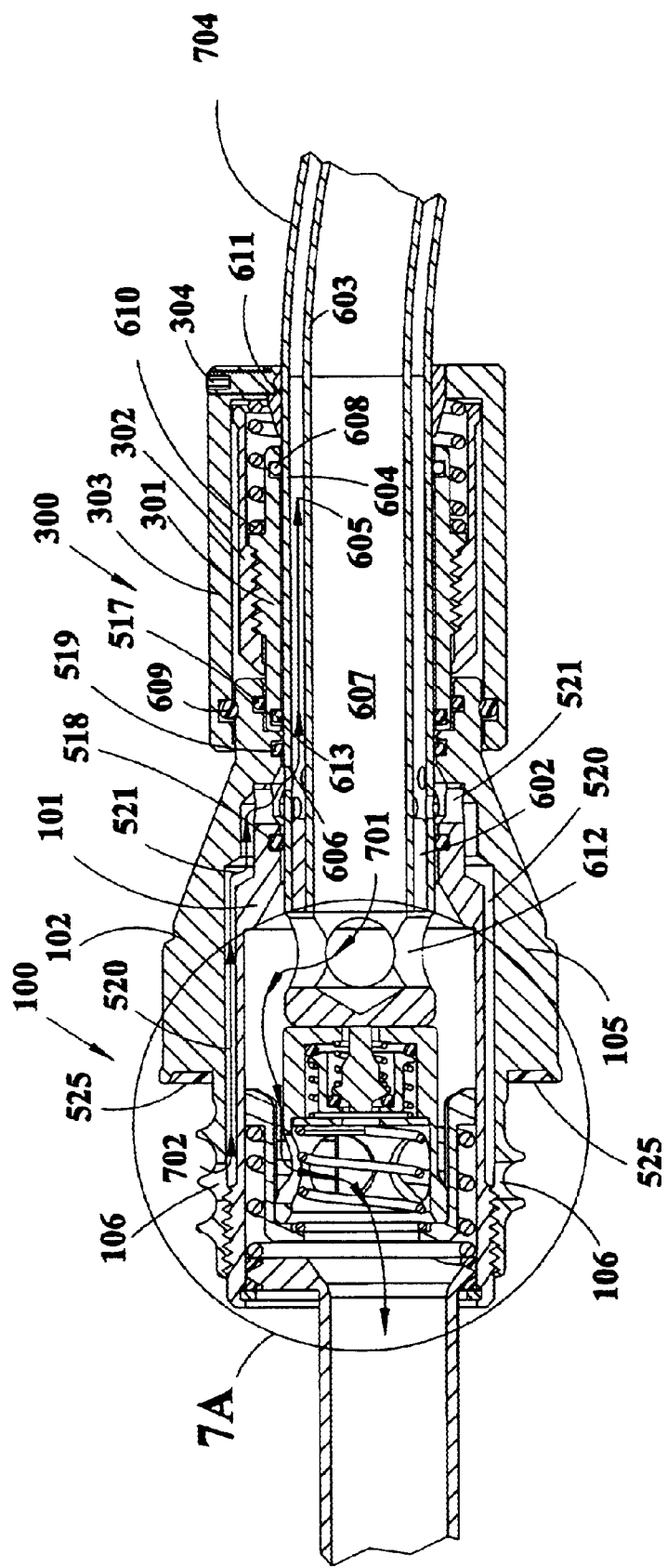
FIG. 7 is a cross-sectional view of the cap assembly coupled together with the nozzle assembly.

FIG. 7 is a cross-section of the cap assembly 100 coupled together with the nozzle assembly 300. The cap assembly 100 is sometimes referred to herein as the female coupling half and the nozzle assembly 300 is sometimes referred to herein as the male coupling half. The nozzle assembly or male coupling half 300 is affixed to the spout portion 704 of a fuel dispensing nozzle (not shown). Fuel dispensing nozzles are well known and one such fuel dispensing nozzle is illustrated in U.S. Pat. No. 4,429,725 to Walker et al. issued Feb. 7, 1984. The nozzle assembly includes an outer sheath 604 and an inner fluid conduit 603 as viewed in FIG. 7. The outer sheath 604 is concentric with the inner fluid conduit 603 and includes apertures 606 therein. Apertures 606 are viewed in FIG. 7 as well as in FIG. 6. Generally, apertures 606 are circumferentially spaced in the outer sheath in two rows. Annulus 605 is formed between the inner conduit 603 sometimes referred to as the fluid conduit 603 and the outer sheath 604. See, FIG. 6.

Still referring to FIG. 6, plug 601 is generally cylindrically shaped and includes a diametrically reduced section 602 which is press fit into annulus 605. The press fit is indicated by reference numeral 614 as indicated in FIG. 6. Additionally, plug 601 is tack welded 615 to the outer sheath 604. Plug 601 includes flush face 305 which engages the substantially flush face of main valve 508 during coupling. When the coupling halves are uncoupled, valve 508 closes and prevents vapor and/or fluid from escaping. Similarly, when the coupling halves are uncoupled, sliding sleeve 301 closes and seals ports 612 and prevents fluid spillage from the nozzle assembly. Very low spillage occurs upon disconnection of the coupling halves because the flush face 305 of the plug 601 abuts the substantially flush face of valve 508 and little or no fluid can reside between the faces when the coupling is connected.

Seal 609 is part of the male coupling half 300 also referred to as the nozzle assembly 300. See, FIGS. 6 and 7. Seal 609 resides in an interior circumferential groove or recess in body 303. Body 303 is secured to the outer sheath 604 by a set screw 604 and a ferrule 611. When the nozzle assembly 300 is coupled to the cap assembly 100, seal 609 functions as a locking seal and it interlocks with circumferential groove 526 as best viewed in FIGS. 5 and 5A. During the process of coupling some slight misalignment is allowed between the male coupling half 300 and the female coupling half 100.

Figure 3:
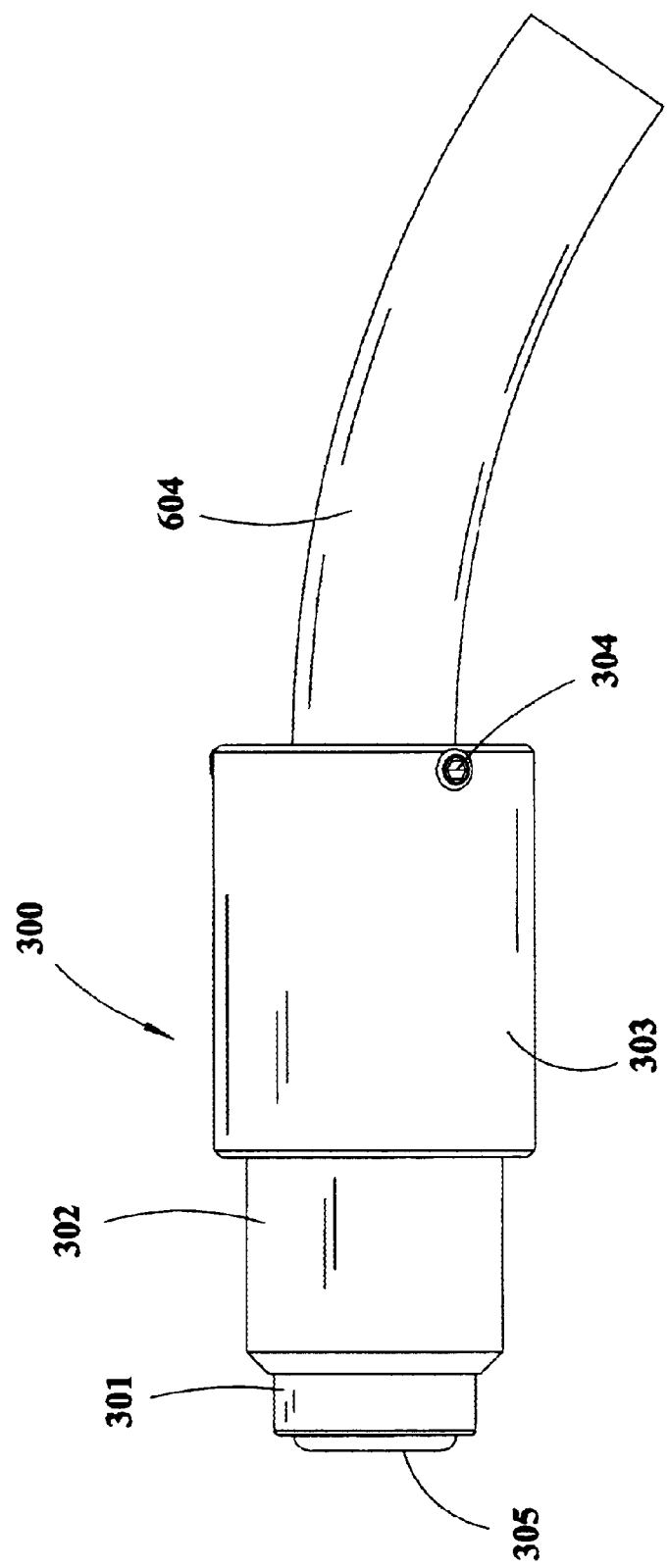
FIG. 3 is a front elevational view of the nozzle assembly (male coupling half).

FIG. 3 is a front elevational view of the nozzle assembly 300. The nozzle assembly includes a sliding sleeve 301 which is affixed by a threaded interconnection to a guide 302. Body 303 is secured to the outer sheath 604 by set screw 304 and the ferrule 611.

Referring again to FIG. 7, reference numeral 607 indicates the gasoline (or other fuel) flow path and reference numeral 701 is a flow arrow indicating the path of fuel flow during fueling. During fueling the liquid fuel flows through the fluid conduit 603 leftwardly when viewing FIG. 7 and proceeds through flow ports 612 in plug 601.

Figure 7A:
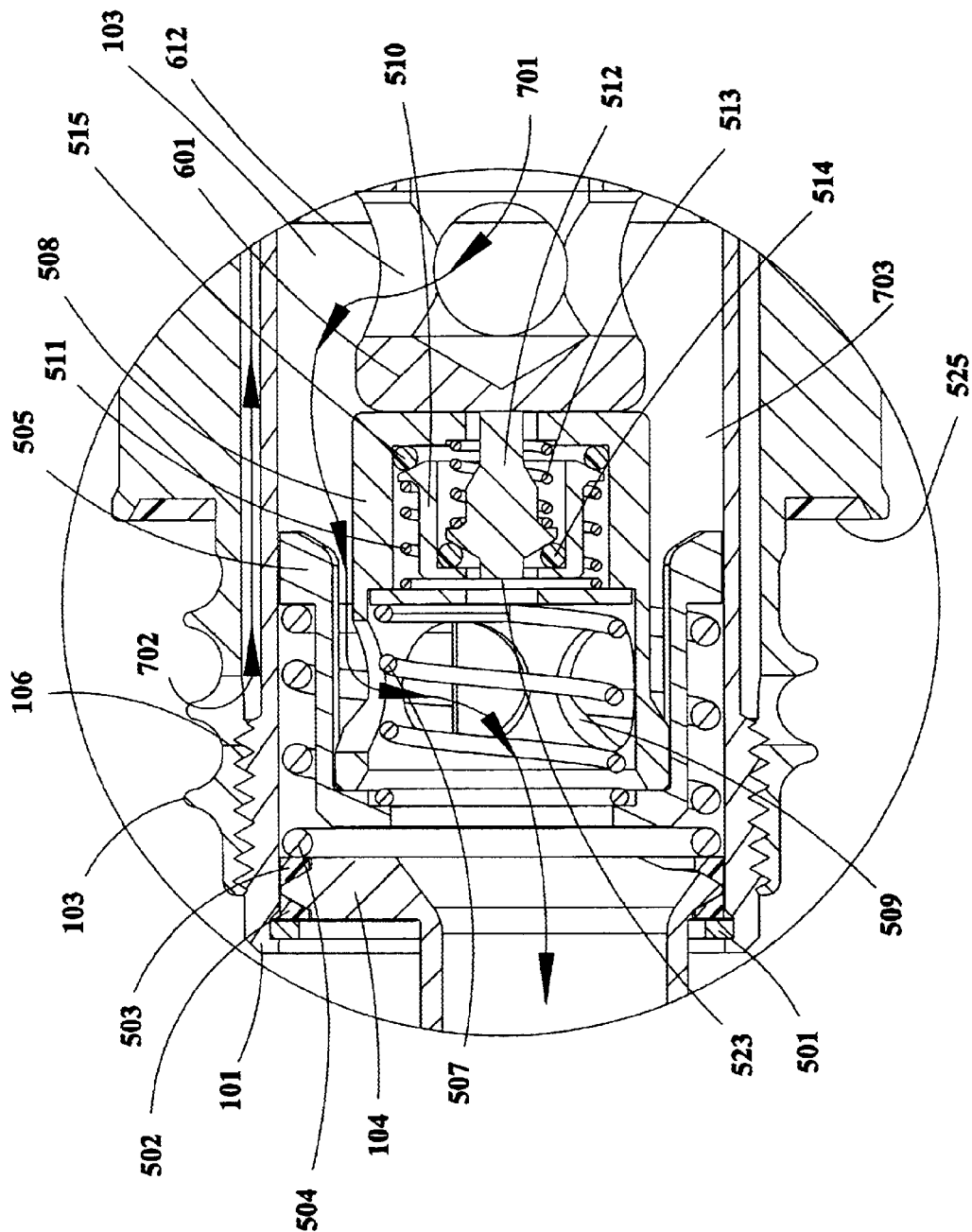
FIG. 7A is an enlarged portion of the cap assembly illustrated in FIG. 7.

FIG. 7A is an enlarged portion of the cap assembly 100 illustrated in FIG. 7. Referring to FIG. 7A, liquid fuel flows through apertures 612 as indicated by a flow arrow 701 into and through chamber 703, past main valve 508 of the cap assembly and through ports 509 of the main valve 508 and into adapter 104.

Figure 1:
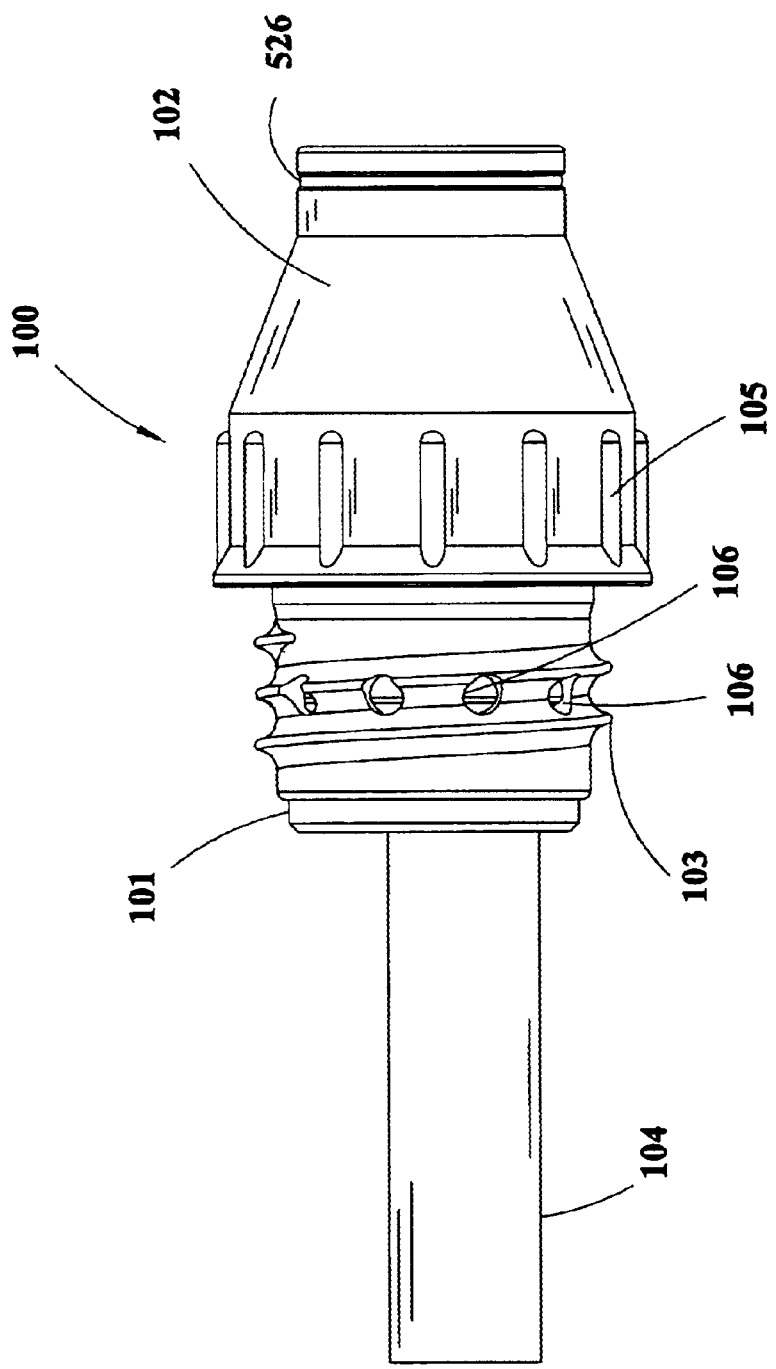
FIG. 1 is a front elevational view of the cap assembly (female coupling half).
Figure 5:
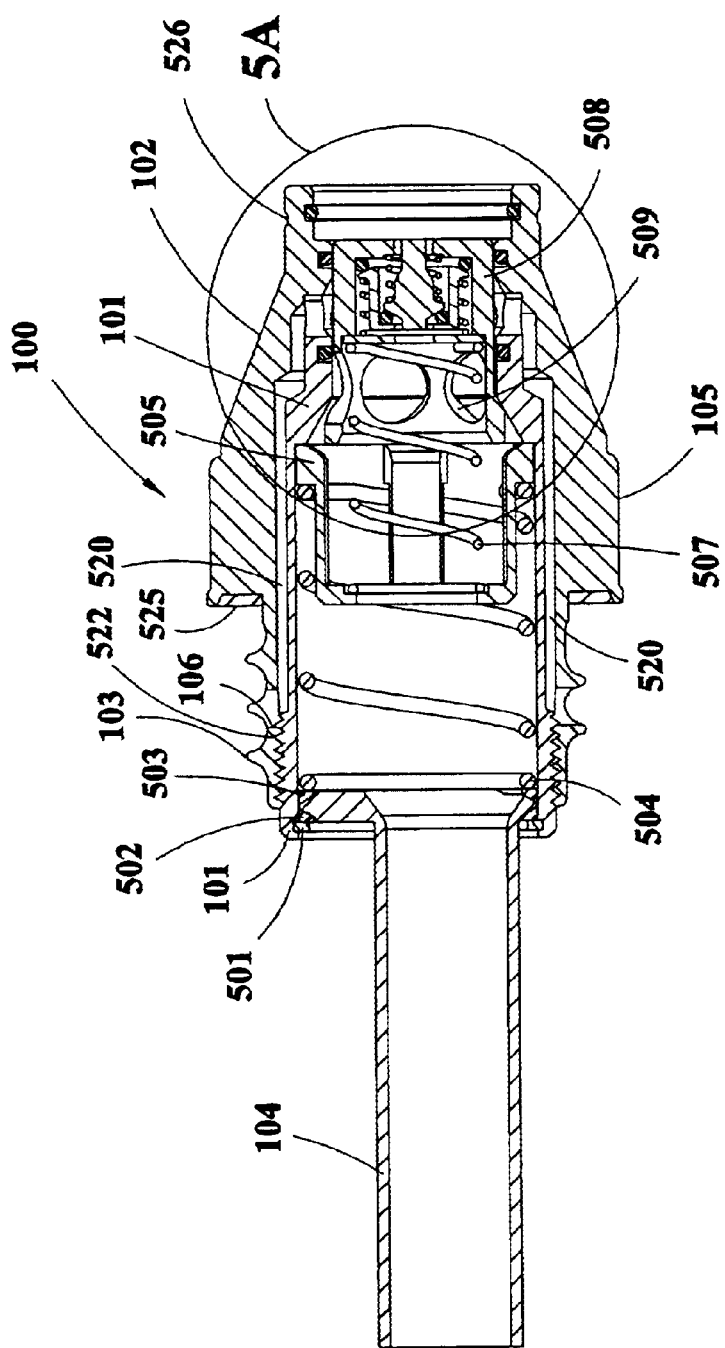
FIG. 5 is a cross-sectional view of the cap assembly (female coupling half) of FIG. 1.

Adapter 104 is viewed in FIGS. 1 and 5. Referring to FIGS. 5 and 7A, adapter 104 is an offset flow conduit and cap 102 which is threaded to body 101 may rotate relative to the adapter 104. Adapter 104 is retained within body 101 of the cap assembly by retaining ring 501 and spring 504. Teflon seals 502 and 503 seal the adapter 104 so that fluid may not escape from the interior of the cap assembly 100.

Cap assembly 100 includes a single continuous thread 103 located on the cap 102 of the assembly 100. Grips 105 on cap 102 enable the cap assembly 100 to be threadably interconnected by hand with an existing vehicle fuel tank. The cap assembly 100 may be threaded to an existing vehicle gasoline tank by simply removing the original gas cap on the tank and replacing it with the cap assembly 100 of the present invention. Cap assembly 100 is small enough to fit inside of vehicle fuel doors when the door is closed and the cap assembly is fully threaded into the receptacle of the gas tank.

Figure 9:
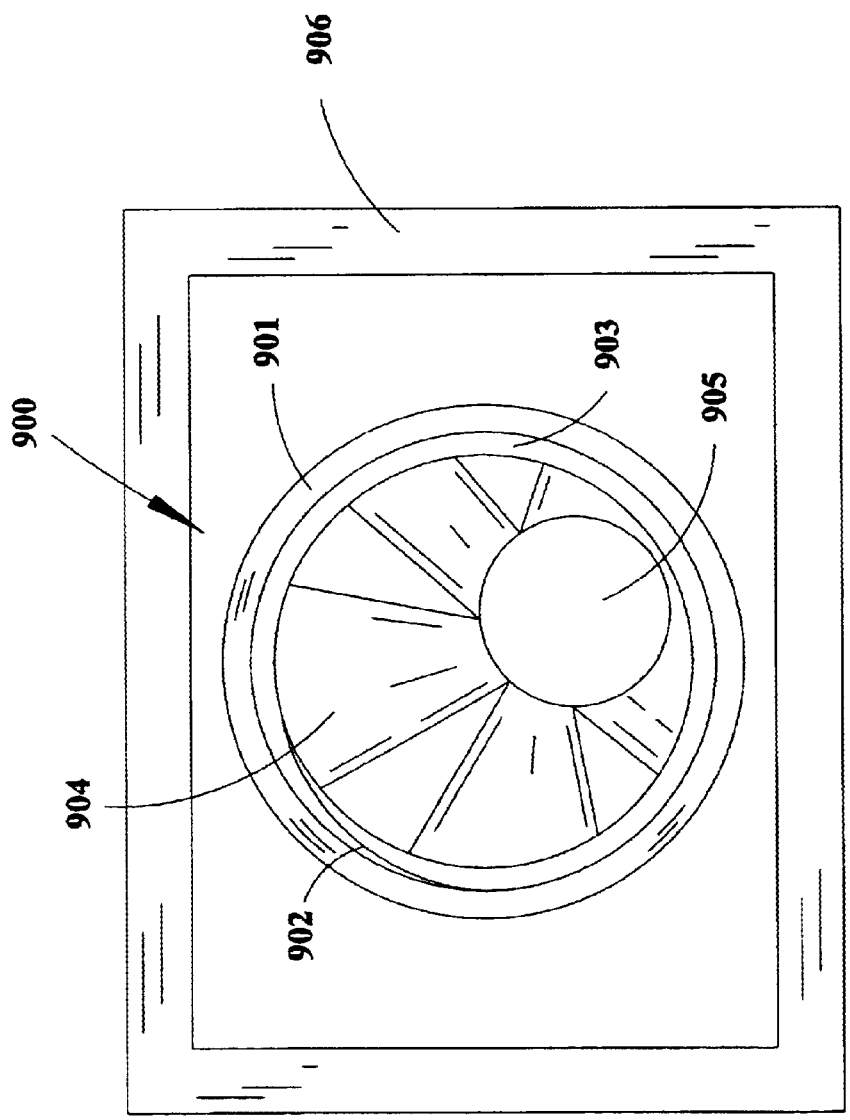
FIG. 9 is a front elevational view of a typical gasoline tank fuel connection with the vehicle's gas cap removed.

Adapter 104 is inserted into and through the flapper valve 905 as indicated in FIG. 9. FIG. 9 is not to scale relative to any of the other drawing figures. Adapter 104 is offset from the central axis of the cap assembly. The cap assembly is generally cylindrically shaped and it may be gripped by grips 105 and the cap assembly screwed into an existing gasoline tank threaded connection as illustrated in FIG. 9.

Reference numeral 900 illustrates the typical gasoline tank connection (nozzle receptacle) on a vehicle with the gas cap removed. Front face 901 of the receptacle engages seal 525 of the cap assembly preventing vapor from escaping to the atmosphere. The initial thread (or beginning thread) is indicated by reference numeral 902 on the receptacle. Reference numeral 903 indicates the continuous thread as it extends helically inwardly toward the gas tank. Reference numeral 904 indicates guides whereby the adapter 104 is guided into the flapper valve 905. On some automobiles, guides 904 are used to direct the spout 704 of the dispensing nozzle into flapper valve 905 of the fuel tank. Reference numeral 906 is the housing of the typical gasoline tank cap on the vehicle.

Once adapter 104 is inserted into and through flapper valve 905 the helical threads 103 of the cap assembly engage the reciprocal helical threads 902/903 as illustrated in FIG. 9 until seal 525 on cap 102 engages the face 901 of the gas tank receptacle.

Apertures 106 in the threaded portion of the cap assembly 100 (female coupling half) are illustrated in FIGS. 1, 4, 5, 7, and 7A. Apertures 106 exist in the single continuous helical thread 103. Thread 103 mates with thread 902/903 but the mating of the threads does not create a seal and gasoline vapors (or other fuel vapors) from the gasoline tank enter apertures 106 as indicated on FIGS. 7 and 7A. The vapor migrates along and between the thread 103 of the cap assembly which is screwed into the mating helical thread 903 of the gas tank receptacle 900 (nozzle receptacle). Seal 525 is an elastomeric seal which abuts the front face 901 of the gasoline tank receptacle 900 preventing escape of fuel vapor to the environment. Flow arrow 702 indicates the path of the gasoline vapors. Annulus 520 is formed between generally cylindrical cap 102 and generally cylindrical body 101 of the cap assembly 100. Passageway designs other than an annulus may be used in the cap assembly and the nozzle assembly without departing from the spirit and scope of the invention. For instance, a bore of a plurality of bores may be used as set forth in FIG. 8.

Figure 5A:
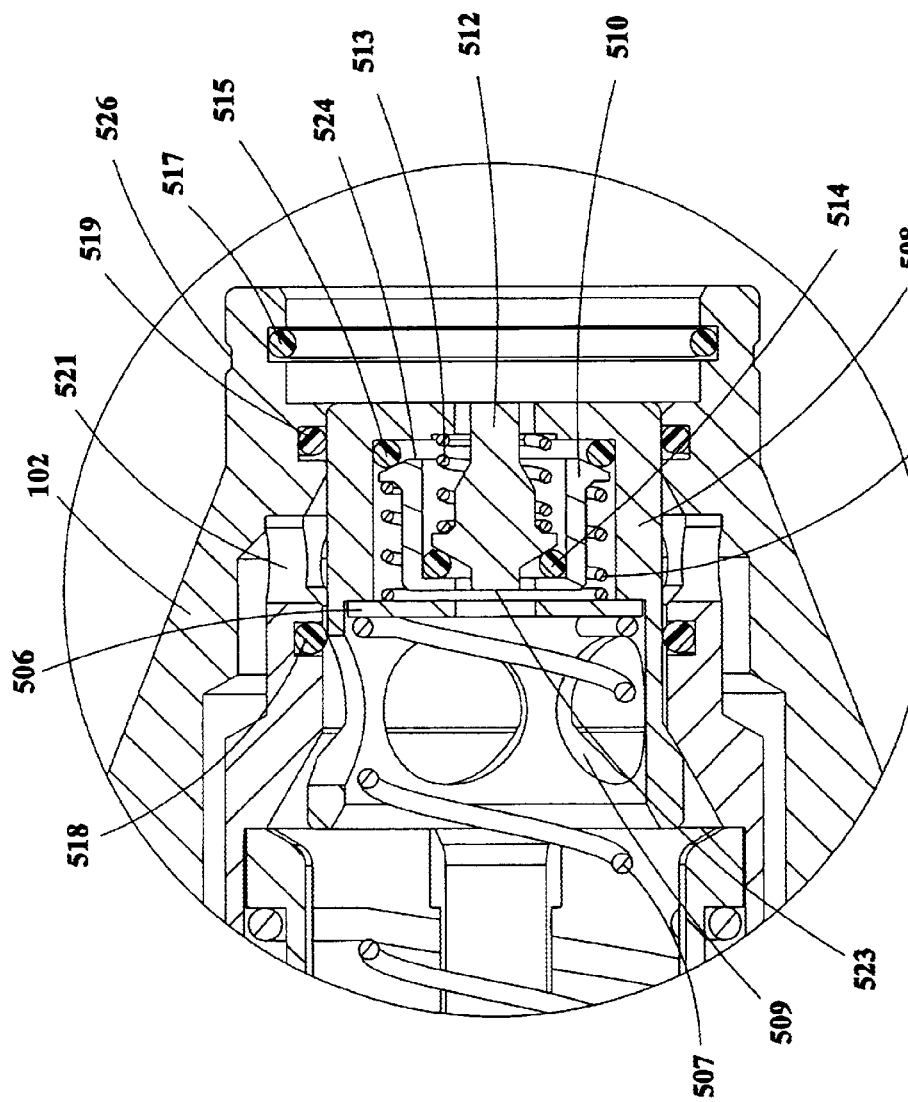
FIG. 5A is an enlarged portion of FIG. 5 illustrating the valves.

Referring to FIG. 5A, a plurality of circumferentially spaced ports 521 are located in body 101 of the female coupling half 100. Main valve 508 is generally cylindrically shaped and includes circumferentially spaced flow ports 509 therein. Spring 507 acts between valve guide 505 and valve 508 to urge valve 508 into the closed position as illustrated in FIG. 5. Valve 508 is illustrated in the open position in FIG. 7. Valve guide 505 is also generally cylindrically shaped and has four circumferential supports spaced at 90° from each other. Spring 504 is operable between adapter 104 and valve guide 105. Spring 504 urges the valve guide 505 to its rightward most position as viewed in FIG. 5.

Threads 522 indicate the interconnection between the cap 102 and the body 101. The adapter 104 is retained within the body 101 of the cap assembly 101 by retaining ring 501 as illustrated in FIG. 5. FIG. 5A is an enlarged portion of FIG. 5 and illustrates vent valve 512 and vent sleeve 510. Vent valve 512 permits the release of pressure within the fuel storage tank when pressure exceeds a predetermined value. Washer 506 retains vent valve 512 and the vent sleeve 510 in position. When vapor pressure in the tank exceeds a predetermined differential between the tank and the atmosphere, pressure applied to internal face 523 of vent valve 512 urges valve 512 rightwardly against spring 513. Spring 513 is operable between vent valve 512 and main valve 508. When sufficient pressure is applied to face 523, spring 513 compresses and vapor is released around seal 514. Seal 514 is an ordinary Viton O-ring seal. Viton is a registered trademark of Dupont Dow Elastomers L.L.C. Corporation of Wilmington, Del.

When fuel is used from the gas tank to fuel the automobile engine, a vacuum is created within the tank which must be relieved. To accomplish the vacuum relief, vent sleeve 510 includes an external face 524 which experiences atmospheric pressure. When the atmospheric pressure exceeds a predetermined level, spring 511 is compressed. Spring 511 is operable between valve washer 506 and vent sleeve 510. When vent sleeve 510 is moved sufficiently leftwardly, air flows around Viton O-ring seal 515 and into the gas tank.

Seals 518 and 519 are also elastomeric Viton O-ring seals and they seal circumferentially spaced ports 521 which reside in cap assembly 100. Reference numeral 517 is also an elastomeric Viton O-ring seal which seals between cap 102 of the female coupling half and the sliding sleeve 301 of the male coupling half upon coupling. See, FIG. 7.

Referring again to FIG. 7, reference numeral 702 indicates the flow path of the fuel vapor which is recovered from the fuel tank during fueling. Reference numeral 702 illustrates the path of vapor through ports 521 and apertures 606 and into the annulus 605. Seal 613, a Viton O-ring seal is an additional seal between the outer sheath 604 and the environment. Seals 518 and 519 are the primary seals which seal ports 521 and apertures 606 and seals 613 and 517 are backup seals. Seal 608, a Viton O-ring seal is an additional backup seal between the sliding sleeve 301 and the outer sheath 604. Spring 610 is operable between sliding sleeve 301 and body 303. In FIG. 7, spring 610 is shown compressed as sliding sleeve 301 has been moved rightwardly compressing it.

Figure 2:
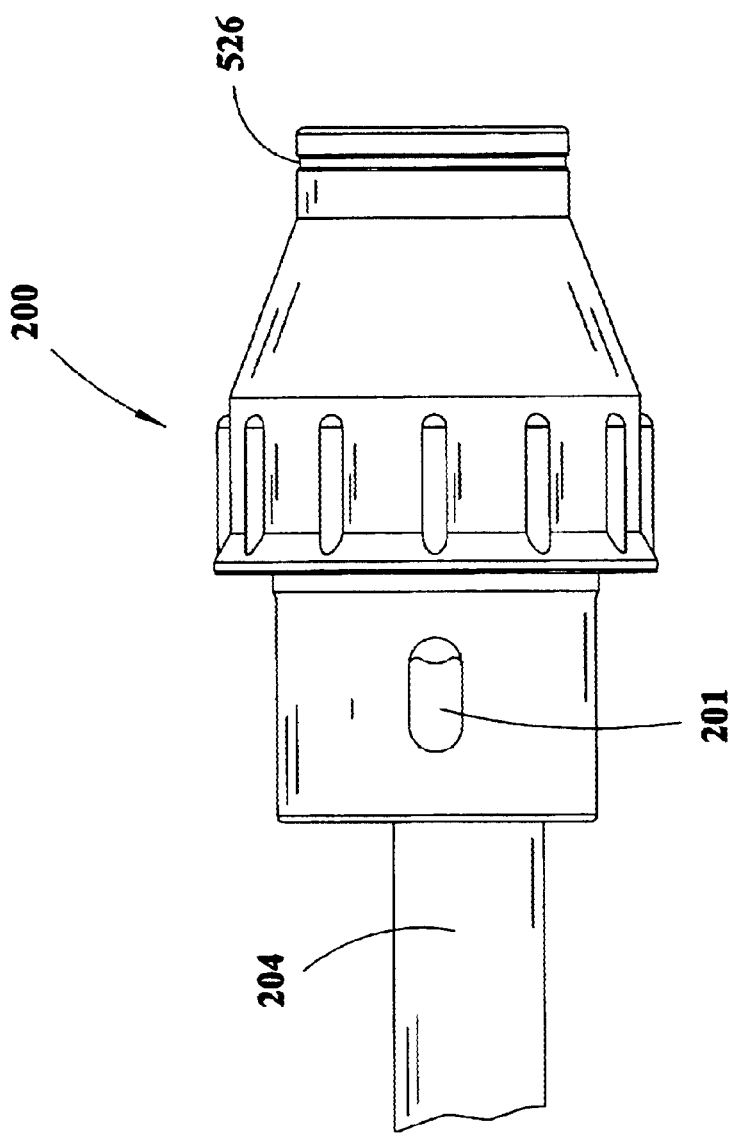
FIG. 2 is a front elevational view of another embodiment of the cap assembly illustrating a locking protrusion.
Figure 2A:
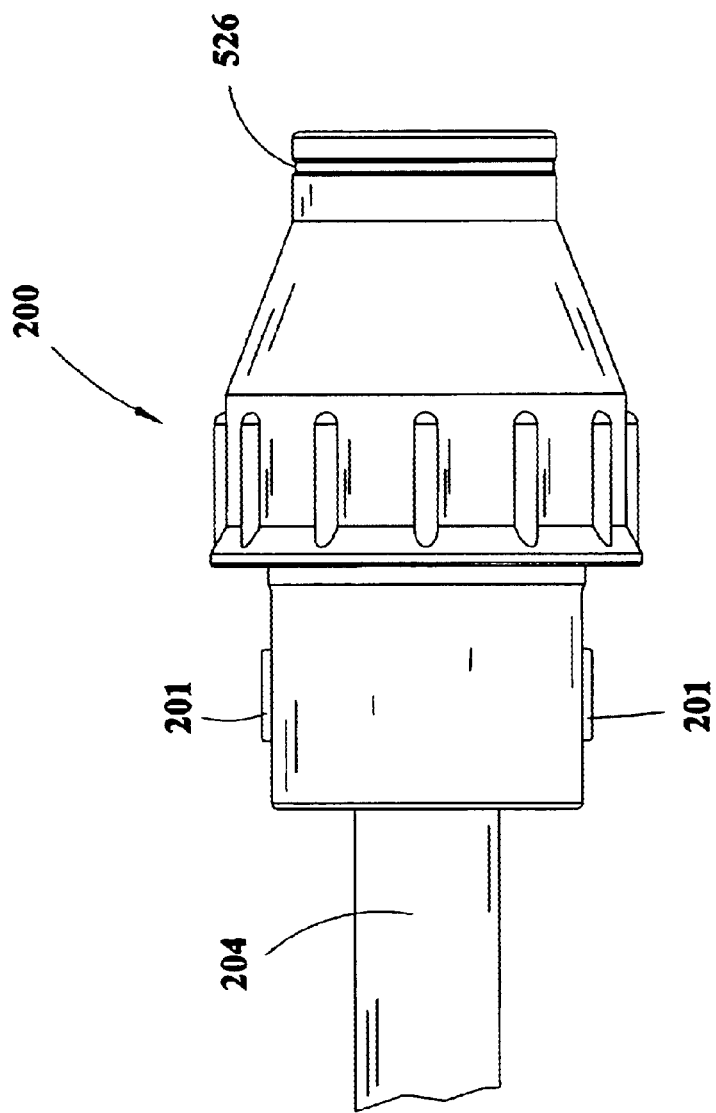
FIG. 2A is a top view of the cap assembly of FIG. 2.
Figure 4:
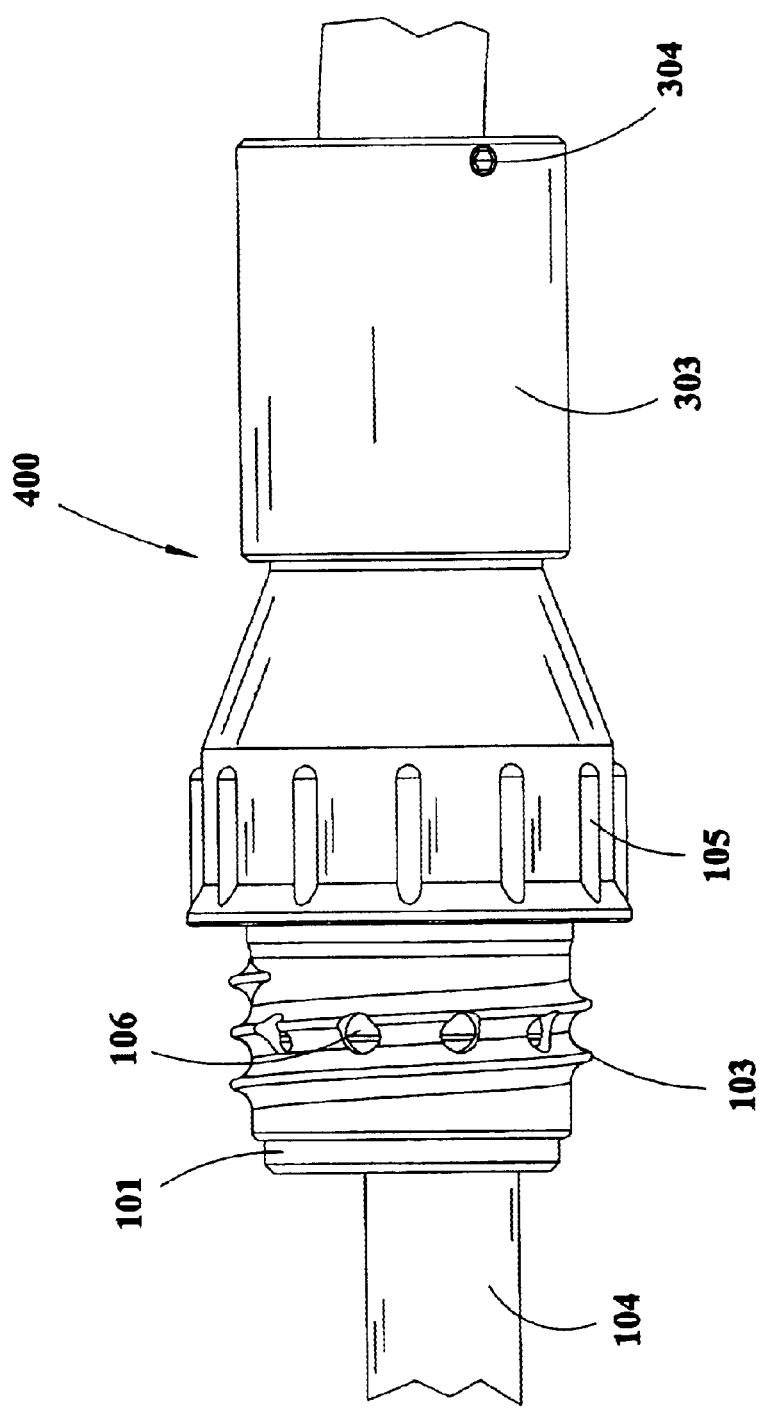
FIG. 4 is a front elevational view of the cap assembly coupled together with the nozzle assembly.

FIG. 4 is a front elevational view of cap assembly 100 coupled together with the nozzle assembly 300. Reference numeral 400 illustrates the cap assembly and nozzle assembly coupled together. FIG. 2 is a front elevational view of another embodiment of the cap assembly 200 illustrating a locking protrusion 201, a key type lock. Adapter 204 is indicated in FIG. 2.

FIG. 6 is a cross-sectional of the nozzle assembly 300 illustrated in FIG. 3. FIG. 6 illustrates the nozzle assembly in the closed position with spring 610 urging sliding sleeve 301 leftwardly. FIG. 7 illustrates the open position of the nozzle or put another way, the open position of sliding sleeve 301 with respect to port 612 of the nozzle. Sleeve 301 of the nozzle assembly functions as a valve with respect to ports 612.

Figure 8:
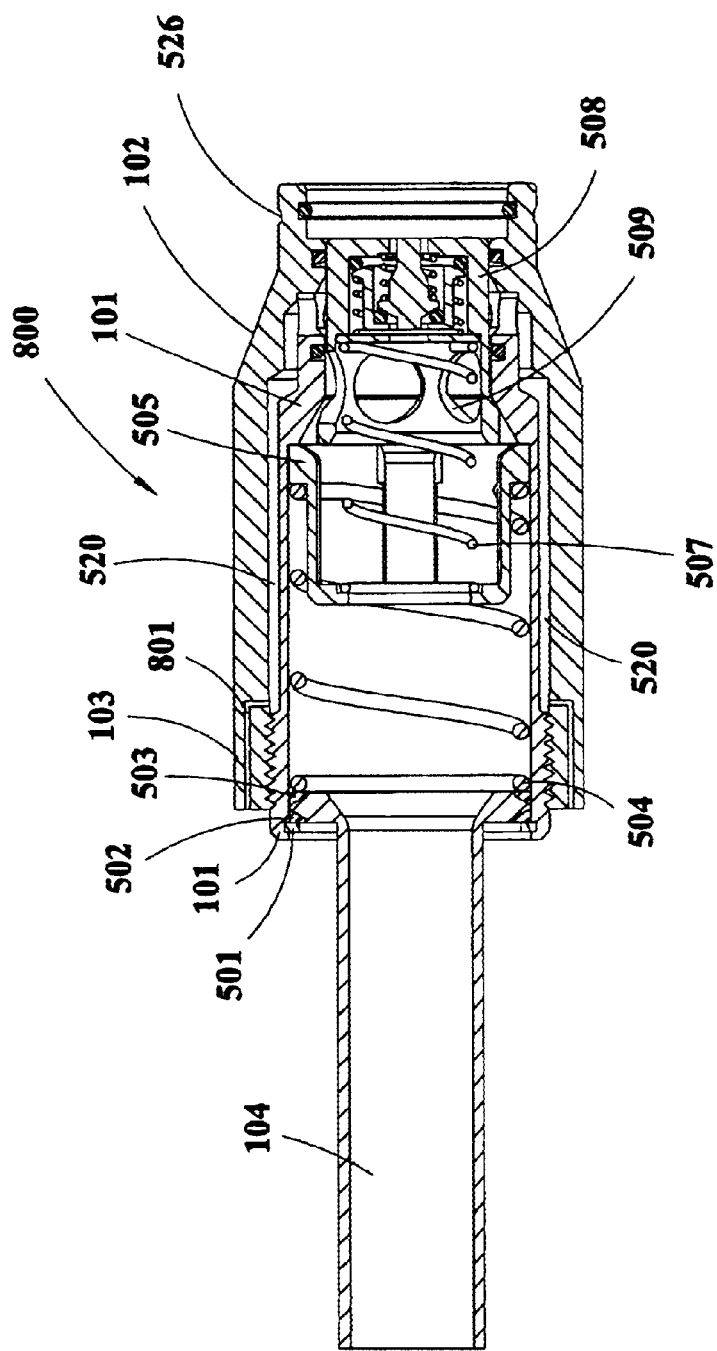
FIG. 8 is a cross-sectional view of another embodiment of the invention for use with an original equipment vehicle gasoline tank.

FIG. 8 is a cross-sectional view of another embodiment of the invention for use with an original equipment vehicle gasoline tank. Reference numeral 800 indicates the original equipment female half 800 which can be welded to a gasoline tank. Reference numeral 801 illustrates a plurality of passageways from the tank. When female half 800 is coupled together with the nozzle assembly 300 of FIG. 7, the flow arrow indicating a path of vapor flow as indicated by reference numeral 702 will be the same.

Figure 6A:
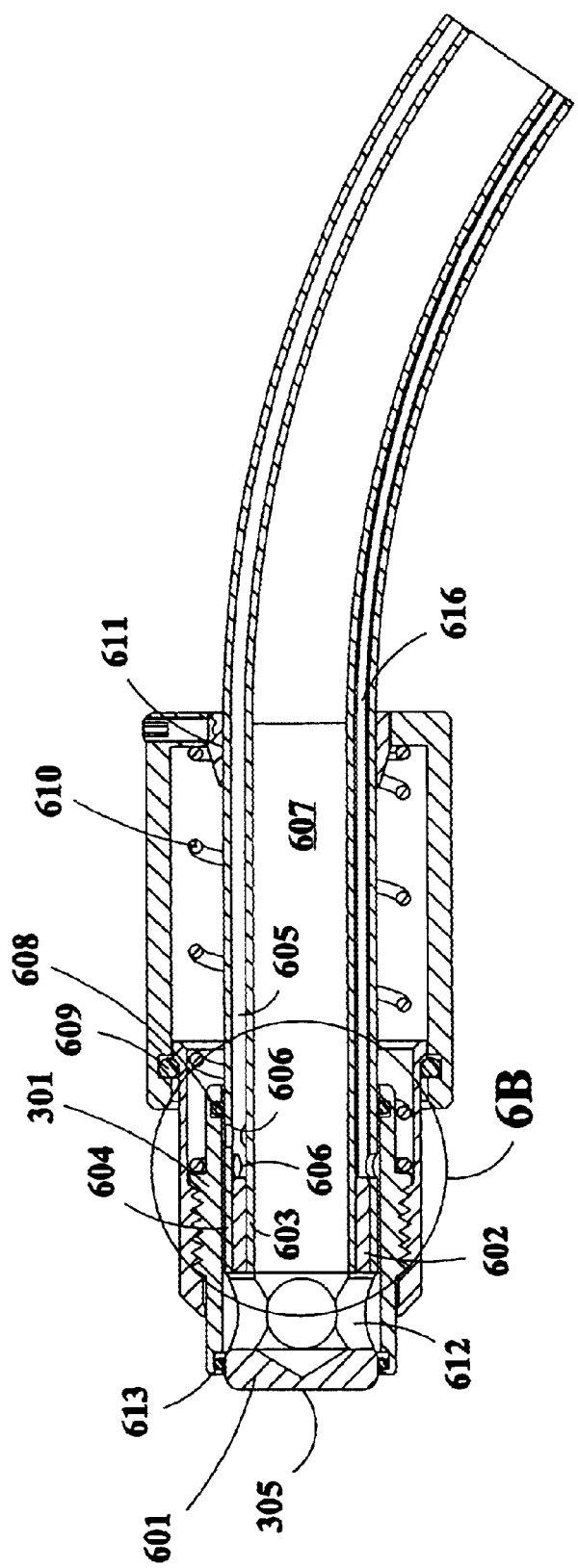
FIG. 6A is a cross-sectional view of the nozzle assembly shown with a sensing conduit in the annulus formed by the outer sheath and the inner fluid conduit.
Figure 6B:
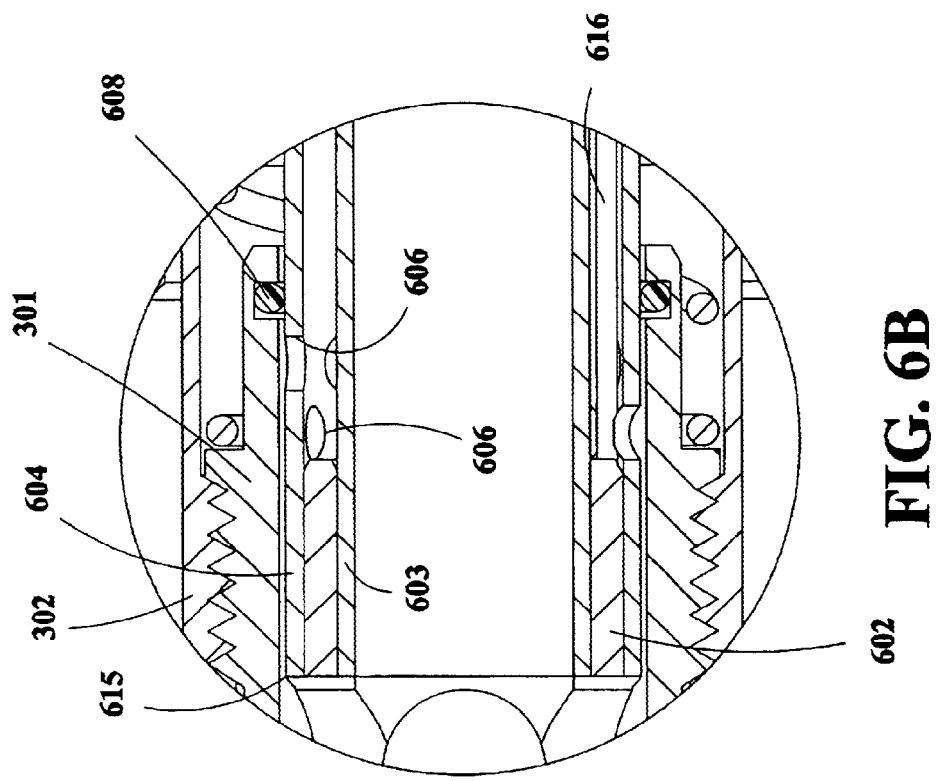
FIG. 6B is an enlarged portion of FIG. 6A.

FIG. 6A is a cross-sectional view of the nozzle assembly shown with the sensing conduit 616 in the annulus formed by the outer sheath 604 and the inner fluid conduit 603. The sensing conduit 616 may be used for detecting fluid in the vapor return line. When the gas tank is full it is possible for fluid to come into apertures 106. However, an appreciable amount of fluid is not expected in apertures 106. FIG. 6B is an enlarged view of a portion of FIG. 6A illustrating the apertures 606 in better detail.

The O-rings used in the invention are elastomeric O-rings made of Viton. The cap 102 and body 101 of the cap assembly 100 are preferably made from aluminum. Preferably the adapter seals 502, 503 are made of Teflon and preferably the adapter 104 is aluminum. Retaining ring 501 which retains the adapter 104 is preferably made from stainless steel. Vent valve 512 in the cap assembly 100 is preferably made of stainless steel and the vent sleeve 5120 in the cap assembly is preferably made of aluminum. The main valve 508 in the cap assembly 100 is preferably made of aluminum and the valve guide 505 is preferably made of stainless steel. In regard to the nozzle assembly 300 the sliding sleeve 301 is preferably made of stainless steel as is the sliding sleeve guide 302. Similarly, the body of the nozzle assembly is preferably made of stainless steel.

Figure 10:
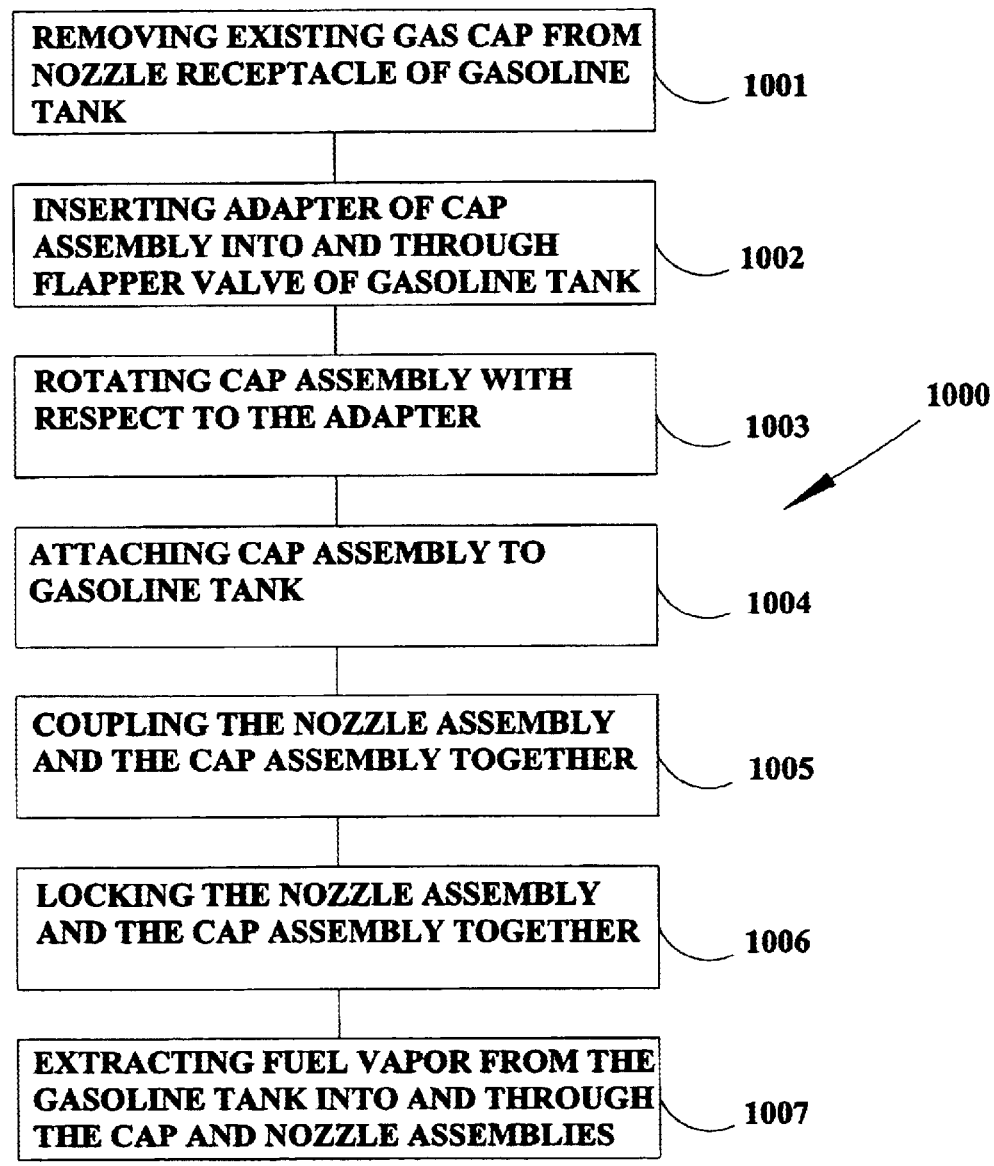
FIG. 10 is a schematic diagram illustrating the method of utilizing the coupling with an existing gasoline tank.

FIG. 10 is a schematic diagram 1000 illustrating the method of utilizing the coupling with an existing gasoline tank. First, the existing gas cap is removed from the existing nozzle receptacle 900 as indicated by reference numeral 1001. The adapter 104 of the cap assembly is then inserted into and through the flapper valve 905 of the gasoline tank. See, reference numeral 1002 and FIG. 9.

The cap assembly 100 is threaded into the nozzle receptacle by rotating 1003 the cap assembly with respect to the adapter thus attaching 1004 cap assembly 100 to the gasoline tank. The nozzle assembly and the cap assembly are coupled 1005 and locked 1006 together. Vapors are extracted 1007 from the gasoline tank into and through the cap and nozzle assemblies. The process of utilizing the nozzle and cap assemblies together is the same when used on a new gasoline tank except steps 1001, 1002, and 1003 are not needed and the cap assembly is welded to the gasoline tank 1004. If the cap assembly must be removed for maintenance or for use at a non-conforming service station (i.e., one that does utilize the male coupling half of the instant invention), the cap assembly is simply unscrewed from the nozzle receptacle.

The instant invention has been described herein with sufficient particularity in regard to the preferred embodiments. Those skilled in the art will recognize that many changes and modifications may be made to the invention as disclosed without departing from the spirit and scope of the appended claims.

I claim:

1. A gasoline tank vapor recovery coupling comprising a male coupling half and a female coupling half; and, said female coupling half includes: a body; a cap concentric with said body forming a continuous annular passageway between said cap and said body permitting longitudinal communication of vapor; said cap includes a radially extending aperture in communication with said continuous annular passageway; and, said continuous annular passageway of said female coupling half communicates with said male coupling half.

2. A gasoline tank vapor recovery coupling as claimed in claim 1 wherein said male coupling half includes a spout of a hand-held gasoline service station dispensing nozzle; said spout having an annulus; and, when said male and female halves are coupled together said passageway of said female half is in communication with said annulus of said male coupling half.

3. A gasoline tank vapor recovery coupling as claimed in claim 1 wherein said female coupling half includes an exterior groove therein and wherein said male coupling half includes a locking seal such that when said coupling halves are coupled said locking seal engages said groove and prevents separation of said halves.

4. A cap assembly for a storage tank comprising a body; a cap concentric with said body forming an annulus between said cap and said body permitting longitudinal communication of vapor; said cap includes an aperture in communication with said annulus; said body includes a port in communication with said annulus; and, a valve slidably disposed within said body opening and closing said port in said body.

5. A cap assembly as claimed in claim 4 wherein said cap includes a continuous screw thread for interconnection with said storage tank.

6. A cap assembly as claimed in claim 5 wherein said continuous thread is helical.

7. A cap assembly as claimed in claim 4 wherein said cap includes a protrusion for interlocking with said storage tank.

8. A nozzle assembly for a storage tank comprising a body; a fluid conduit; an outer sheath concentric with and surrounding said fluid conduit forming an annulus; said outer sheath secured to said body; a plug partially residing in said annulus and secured thereto; said plug includes a port; a sliding sleeve for covering and uncovering said port; a sleeve guide; said sliding sleeve being affixed to said sleeve guide and, a spring operable between said body and said sliding sleeve.

9. A coupling for a fuel storage tank comprising a cap assembly and a nozzle assembly; said cap assembly comprises: a body; said body includes a radially extending aperture in communication with said fuel tank; a port; and a passageway interconnecting said aperture and said port; and, a valve for opening and closing said port; and, said nozzle assembly comprises: a fluid conduit and an outer sheath forming a passageway therebetween; said outer sheath includes an aperture; said aperture in said passageway of said nozzle communicating with said port, said passageway, and said aperture of said cap assembly enabling communication between said fuel tank and said passageway of said nozzle assembly.

10. A coupling for a fuel storage tank as claimed in claim 9 wherein: (a) said cap assembly further comprises: an adapter rotatably mounted in said body, a valve guide; said valve having ports, and, said first spring operable between said adapter and said valve guide and a second spring operable between said valve guide and said valve; (b) said nozzle assembly further comprises: a fluid conduit and an outer sheath concentric with and surrounding said fluid conduit forming said passageway of said nozzle therebetween, said outer sheath secured to said body, a plug partially residing in said passageway and being affixed to said conduit and said sheath; said plug includes a port, a sliding sleeve and a sliding sleeve guide, said sliding sleeve being affixed to said sleeve guide, and, a third spring operable between said body and said sliding sleeve; and, (c) upon coupling of said cap assembly and said nozzle assembly together, said plug of said nozzle engages said valve of said cap assembly compressing first and second springs of said cap assembly uncovering said port in said body; said body of said cap assembly engages said sliding sleeve compressing said third spring uncovering said aperture in said passageway of said nozzle; and, said passageway of said nozzle being in communication with said port, said passageway and said aperture of said cap assembly enabling communication between said fuel tank and passageway of said nozzle.

11. A coupling for a fuel storage tank comprising a male coupling half and a female coupling half, said male coupling half includes an inner fluid conduit, an outer sheath having an inner wall and an outer wall, and a body affixed to said outer wall of said outer sheath, said female half includes a body and a cap affixed to said body, said cap of said female half includes a circumferential groove therein and said body of said male coupling half includes a circumferential groove and a seal partially residing in said circumferential groove, and, said seal of said male coupling half engages said circumferential groove of said cap of said female coupling half when said male and female coupling halves are coupled together.

12. A method of recovering fuel vapor from a fuel storage tank during refueling of said fuel storage tank comprising the steps of: inserting an adapter into and through a flapper valve of said fuel tank; rotating the cap and body of the cap assembly with respect to said adapter securing said cap assembly to said fuel storage tank; coupling a nozzle assembly and a cap assembly together; locking said nozzle assembly and said coupling assembly together; and, extracting vapors from said fuel storage tank into and through said cap assembly and said nozzle assembly.

13. A method of recovering fuel vapor from a fuel storage tank utilizing male and female coupling halves, comprising the steps of: affixing a female coupling half to said fuel storage tank by threading said female coupling half to said fuel storage tank; coupling said male and female halves of said coupling together; and, extracting vapors from said fuel storage tank into and through annular passageways of said male and female halves of said coupling.

14. A method of recovering fuel vapor from an existing fuel storage tank having a nozzle receptacle and a gas cap covering and sealing said nozzle receptacle, utilizing a coupling comprising a cap assembly and a nozzle assembly wherein said cap assembly includes an adapter and a body, comprising the steps of: removing the existing gas cap from said nozzle receptacle; inserting an adapter into and through a flapper valve of said fuel tank; rotating said body with respect to said adapter; attaching said cap assembly to said existing fuel storage tank; coupling said nozzle assembly and said cap assembly together; and, extracting fuel vapor from said fuel storage tank into and through said cap assembly and said nozzle assembly.

15. A method of recovering vapor from an existing fuel storage tank as claimed in claim 14 further comprising the steps of: locking said cap assembly and said nozzle assembly together.

\* \* \* \* \*